United States Patent [19]
Horbaschek

[11] Patent Number: 4,517,594
[45] Date of Patent: May 14, 1985

[54] X-RAY DIAGNOSTIC INSTALLATION

[75] Inventor: Heinz Horbaschek, Erlangen, Fed. Rep. of Germany

[73] Assignee: Siemens Aktiengesellschaft, Berlin & Munich, Fed. Rep. of Germany

[21] Appl. No.: 505,963

[22] Filed: Jun. 20, 1983

[30] Foreign Application Priority Data

Jul. 5, 1982 [DE] Fed. Rep. of Germany ....... 3225061

[51] Int. Cl.[3] ........................ H04N 7/18; G03B 41/16
[52] U.S. Cl. ........................................ 358/111; 378/99
[58] Field of Search .......................... 358/111; 378/99; 128/653, 659

[56] References Cited

U.S. PATENT DOCUMENTS 4,335,307 6/1982 DeVries ................................ 378/99

FOREIGN PATENT DOCUMENTS 2032780 9/1977 Fed. Rep. of Germany .
1237007 6/1971 United Kingdom .

*Primary Examiner*—Howard W. Britton
*Attorney, Agent, or Firm*—Hill, Van Santen, Steadman & Simpson

[57] ABSTRACT

The disclosure relates to an x-ray diagnostic installation comprising an x-ray image intensifier television chain, whereby a television camera is coupled via an optics with a base lens and a camera lens to the x-ray image intensifier, a mirror being disposed in the parallel ray path of said optics for coupling a portion of the luminous flux to a light detector, wherein an additional lens is arranged between the mirror and light detector. The light detector is comprised of a matrix of photosensors whose respective outputs are connected via respective switches to a sum amplifier.

4 Claims, 3 Drawing Figures

X-RAY DIAGNOSTIC INSTALLATION

BACKGROUND OF THE INVENTION

The invention relates to an x-ray diagnostic installation comprising an x-ray image intensifier television chain, wherein a television camera is coupled, by means of an optical system with a base lens and a camera lens, to the x-ray image intensifer, in the parallel ray path of which a mirror is disposed which couples a portion of the luminous flux to a light detector.

In the German LP 16 14 683 and in the corresponding British Pat. No. 1,237,007, an x-ray diagnostic installation of the type initially cited is described wherein an x-ray image intensifier converts an x-ray image into visible image. By means of a lens system with a base lens and a camera lens the output image of the x-ray image intensifier is transmitted to a television camera. A portion of the light emanating from the output fluorescent screen of the x-ray image intensifier is projected, via a small mirror, onto the photocathode of a photomultiplier whose output signal is employed for the control of the high voltage generator of the x-ray diagnostic installation. A desired dominant measurement field is established through the mechanical conditions. A signal representing the image contents within the dominant field is obtained by means of the photomultiplier. A subsequent alteration of the dominant measuring field can only be attained with difficulty.

It is furthermore known from the German LP 20 32 780 to employ a television pickup tube as a light detector for a radiographic control system. For this purpose the cyclically varying deflection signals for effecting cyclical deflection of the scanning beam are disconnected (or switched off) and the scanning beam is enlarged to correspond to the desired dominant field size. Through application of steady deflection signals any desired position of the dominant field can be attained. Such a measuring and control system is not suitable for rendering possible a varying weighting of individual measuring fields pertaining to the dominant field, and, in the case of indirect radiographs, it is not suitable for very short exposure times.

SUMMARY OF THE INVENTION

The invention proceeds from the objective of producing an x-ray diagnostic installation of the type initially cited wherein the dominant measuring field is freely selectable and a measured value detection for the control of the high voltage generator proceeds in parallel fashion, so that also the shortest exposure times can be obtained.

The objective is achieved in accordance with the invention in that an additional lens is arranged between the mirror and light detector, and that the light detector is comprised of a matrix of photosensors whose outputs are connected via respective switches to a sum amplifier. With this installation, through actuation of the switches, in a simple fashion, any desired areas of the x-ray image can be selected as the dominant measuring field.

The areas can be varyingly evaluated if the outputs of the photosensors are each connected with a respective weighting circuit which is connected to the sum amplifier. An integration of the measuring signal within the selected dominant field is achieved if integration stages are connected with the outputs of the photosensors. It has proven advantageous if peak value circuits are arranged after the photosensors.

The invention shall be explained in greater detail in the following on the basis of an exemplary embodiment illustration on the accompanying drawing sheet; and other objects, features and advantages will be apparent from this detailed disclosure and from the appended claims.

DETAILED DESCRIPTION

Figure 1:
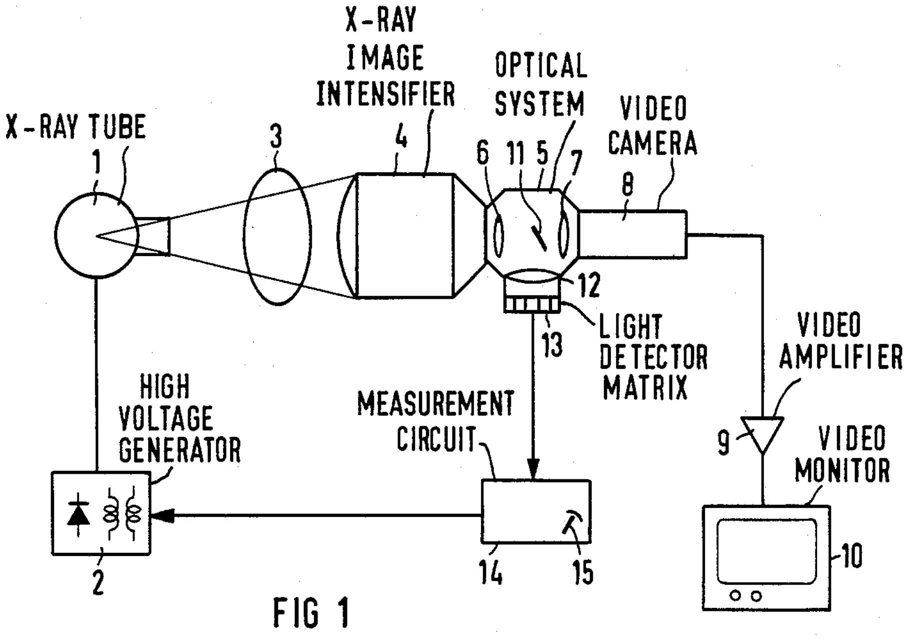
FIG. 1 illustrates a block circuit diagram of an inventive x-ray diagnostic installation.

In FIG. 1 an x-ray tube 1 is illustrated which is operated by a high voltage generator 2 and emits a radiation beam which penetrates a patient 3 and projects a radiation image on the input fluorescent screen of an x-ray image intensifier 4. The x-ray image intensifier 4 converts the radiation image into a visible image at the output fluorescent screen. Coupled to the x-ray image intensifier 4 is an optical system 5 which contains a base lens 6 and a camera lens 7. Through these lenses 6 and 7 the output image of the x-ray image intensifier is projected onto a video camera 8. The output signal of the video camera 8 is amplified in a video amplifier 9 and displayed on a monitor 10.

In the parallel ray path of the optical system 5 a semi-transmissive mirror 11 is arranged which divides the parallel rays. An additional lens 12 forms an image on a light detector 13. The light detector 13 is comprised of a number of photosensors, arranged in a matrix formation, which, in this example, is formed from five rows of five sensors each (i.e., $5\times5=25$ sensors). The light detector 13 is connected with a measurement circuit 14 which includes an adjuster 15 for selecting a desired weighting value. The measurement circuit 14 is connected to the high voltage generator 2.

Figure 2:
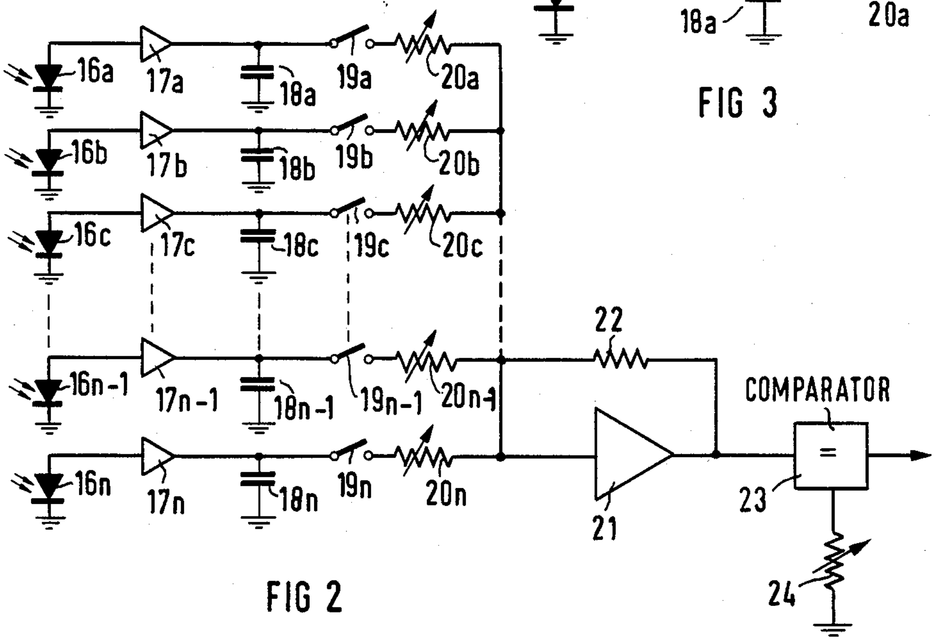
FIG. 2 is a circuit diagram showing a preferred form of the measuring circuit for the embodiment of FIG. 1.

In FIG. 2 the light detector 13 and the measurement circuit 14 are illustrated. The light detector 13 is comprised of a number of photosensors arranged in matrix fashion; for example, photodiodes 16*a* through 16*n*, whereby n can assume any desired value. Connected with the outputs of the photodiodes 16 are amplifiers 17*a* through 17*n* which, together with the photodiodes 16, can be integrated on a semiconductor chip. Connected with the outputs of the amplifiers 17 are capacitors 18*a* through 18*n* for the integration of the measurement signals with respect to time. Connected to the capacitors 18 are switches 19*a* through 19*n* which render possible a selection of the photosensors which are to contribute to the output signal. Arranged after the switches 19*a* through 19*n* are adjustable resistances 20*a* through 20*n* which are connected to the input of an amplifier 21. The output of the amplifier 21 is connected with its input for the purpose of feedback via a resistance 22. The resistances 20*a* through 20*n*, the amplifier 21, and the resistance 22 together form a generally known summing circuit. Connected to the output of the amplifier 21 is a comparator 23 which compares the summed output signal of the selected photodiodes with a desired value specified by an adjustable resistance 24.

The output signal of comparator 23 is connected with and controls the high voltage generator 2.

Through the switches 19*a* through 19*n* any desired portion of the x-ray image can be selected as the dominant measurement field. However, also several separate portions can be interconnected at the input of the summing amplifier. Through the adjustable resistances 20*a* through 20*n* the individual portions can be varying evaluated or weighted. Thus, for example, an output signal of one photodiode can be evaluated with the factor of one, whereas the signals of all adjoining photodiodes can be weighted in an attenuated fashion.

The switches 19*a* through 19*n* can be individually activated or they can be selected by an adjustment control device (not shown) which is coupled with each of the switches and which is programmed to actuate different configurations of said switches to establish different predetermined measurement fields.

Figure 3:
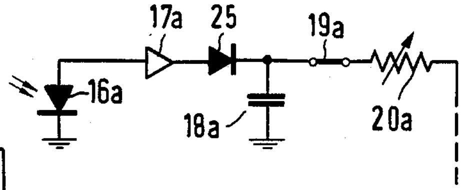
FIG. 3 shows an alternative peak value sensing circuit for association with each of the photodiodes of FIG. 2.

If one diode 25 is connected between each of the respective amplifiers 17*a* through 17*n* and a corresponding one of the capacitors 18*a* through 18*n*, as indicated in FIG. 3, a peak evaluation of the measurement signals can be conducted which is particularly suitable for the interconnection of several photodiodes into a dominant measurement field.

This measured value detection, in addition to the control of the dose rate for fluoroscopy, can also be employed for exposure control for indirect radiographs or electronic individual image storage.

It will be apparent that many modifications and variations may be made without departing from the scope of the teachings and concepts of the present invention.

I claim as my invention:

1. An x-ray diagnostic installation, comprising an x-ray image intensifier television chain including an x-ray image intensifier for supplying a light image at its output in accordance with an incident x-ray image, a video camera, an optics system with a base lens and a camera lens for coupling the video camera with the light image from the x-ray image intensifier, a mirror being disposed in a parallel ray path of said optics system, a light detector coupled with the luminous flux from said image intensifier by means of said mirror, an additional lens being arranged between the mirror and the light detector, the light detector comprising a matrix of photosensors coupled with the luminous flux from said image intensifier by means of said mirror and said additional lens such that respective photosensors supply at their respective outputs respective signals representative of the luminous flux at respective different regions of the light image supplied by said image intensifier, a summing amplifier for supplying an output which is a measure of the brightness of the light image supplied by said image intensifier, and switch means selectively controlling the coupling of the respective photosensors of said matrix with said summing amplifier and selectively determining different configurations of said photosensors of said matrix which contribute to the output from said summing amplifier thereby to select the regions of the light image from said image intensifier which are to be dominant in the assessment of the brightness of said light image.

2. An x-ray diagnostic installation according to claim 1, with a weighting circuit for selectively weighting the outputs of the photosensors, said weighting circuit being connected with the summing amplifier for controlling the weighting of each selected configuration of said photosensors.

3. An x-ray diagnostic installation according to claim 1, with respective integration stages connected with the outputs of the respective photosensors for providing respective signals to said summing amplifier representing the luminous flux incident on the respective photosensors.

4. An x-ray diagnostic installation according to claim 1, characterized in that peak value circuits are connected with the outputs of the photosensors.

* * * * *